United States Patent Office 3,816,556
Patented June 11, 1974

3,816,556
COMPOSITION COMPRISING A POLYSALT AND PAPER MADE THEREWITH
Anthony Thomas Coscia, South Norwalk, and Laurence Lyman Williams, Stamford, Conn., assignors to American Cyanamid Company, Stamford, Conn.
No Drawing. Filed June 9, 1972, Ser. No. 261,494
Int. Cl. C08g 45/04
U.S. Cl. 260—836
3 Claims

ABSTRACT OF THE DISCLOSURE

There is provided a polysalt consisting essentially of (a) an anionic, water-soluble polyacrylamide having a sufficient number of glyoxal-reactive amide substituents and glyoxalated amide substituents to be thermosetting, and (b) a water-soluble, cationic, thermosetting, wet-strength resin for paper, said resin containing amine groups reacted with epichlorohydrin, the molar ratio of the anionic substituents in said polysalt to the cationic substituents therein being between about 1:99 and 25:75, and a method for its incorporation into paper pulp so as to impart enhanced wet strength thereto.

---

The present invention relates to water-soluble polysalts of opposite electrostatic signs useful for the manufacture of wet-strength paper, to wet-strength paper composed of fibers bonded together by the polysalts, and to papermaking processes.

The manufacture of paper containing both cationic and anionic water-soluble polymers is a new development in the papermaking art; cf. U.S. Pats. Nos. 3,021,257 (Stauffenberg); 3,049,469 (Davidson); 3,146,157 (Morgan et al.); 3,224,986 (Butler); 3,556,932 (Coscia et al.); 3,592,731 (Griggs); and 3,660,338 (Economou). However, the products as well as processes of the aforementioned patents unfortunately possess shortcomings and, thus, have come only into limited use. For instance, in certain instances, each of the polymers comprising a polysalt had to be added separately to the pulp, creating a necessity for double procurement, double storage, and double metering of the materials. In other instances, pH control within narrow limits of the papermaking operation has proved critical, leading to further difficulties. In still other instances, the processes have required the addition of a third component to the pup (a "complexing" or "mordanting" component), which requires a further manipulative step. If a unitary composition of improved wet strength and process for obtaining same could be devised for avoiding the shortcomings of the prior art procedures, a long-felt need in the art would be realized.

It has been found that certain polysalts possess enhanced activity with respect to papermaking processes. In brief, the polysalts of the present invention consist essentially of: (a) an anionic, water-soluble polyacrylamide having a sufficient number of glyoxal-reactive amide substituents and glyoxalated amide substituents to be thermosetting, the ratio of the number of said glyoxalated amide substituents to the number of said glyoxal-reactive amide substituents being in excess of 0.06:1, and (b) a water-soluble, cationic, thermosetting, wet-strength resin for paper, said resin containing amine substituents reacted with epichlorohydrin, the molar ratio of the anionic substituents to the cationic substituents in the polysalts being between about 1:99 and 25:75, respectively. Substantially improved properties in paper are attained when the polysalts of the present invention are employed as compared to the use of each of the anionic and cationic resins. The polysalts are employed as stable aqueous solutions having a pH between about 0.5 and 4.

Illustrative of the anionic polymers are those set forth in our U.S. Pat. No. 3,556,932, which is incorporated herein by reference. As one anionic polyacrylamide resin, it may consist of (a) unsubstituted acrylamide linkages, (b) glyoxalated acrylamide linkages, and (c) acrylic acid linkages, the molar ratio of the sum of linkages (a) and (b) to linkages (c) being between about 99.5:0.5 and 75:25.

Exemplary of the cationic component of the polysalts of this invention, which can be any polymer containing amine groups reacted with epichlorohydrin, are, for instance, the diethylenetriamine-adipic acid-epichlorohydrin polymer disclosed in U.S. Pat. No. 2,926,154 and the itaconic acid-diethylenetriamine-epichlorohydrin resin of U.S. Pat. No. 3,125,552.

The invention is further described in the examples which follow. These examples represent preferred embodiments of the invention and are not to be construed in limitation thereof. Parts are by weight unless otherwise stated; and anionic polymers, when added alone to pulp, are precipitated on the fibers by the action of alum at about pH 5.5 which is not thereafter adjusted. The polysalt solutions of the examples are suitable for use as prepared, and for convenience in metering, are generally diluted to 1% solids before addition to the pulp.

EXAMPLE 1

The following illustrates the preparation of a polysalt according to the present invention wherein the anionic component is a thermosetting, glyoxalated, acrylamide-acrylic acid copolymer and the cationic component is a thermosetting, polyamidopolyamine - epichlorohydrin resin.

The anionic component is prepared by adding 36.5 g. of 40% aqueous glyoxal solution (0.25 mol) to 695 g. of a 10%, by weight, aqueous solution of a 90:10 molar ratio acrylamide-acrylic acid copolymer having a molecular weight between 7,000 and 20,000. The mixture is allowed to stand at pH 8 until its viscosity has increased to about 30 seconds as measured to a No. 3 Shell Cup, after which it is acidified to pH 3 to arrest the reaction and is then diluted to 10% solids.

One hundred grams of the resultant solution are added to 400 g. of a 10%, by weight, solution of the thermosetting, cationic, adipic acid-diethylenetriamine-epichlorohydrin, wet-strength resin of U.S. Pat. No. 2,926,116 (commercially known as "Kymene 557"). Sufficient sulfuric acid is added to reduce the pH of the resultant solution to 3.0.

There results a transparent, straw-colored mixture having a viscosity of 15 to 20 centipoises at 25° C.

EXAMPLE 2

The following illustrates the manufacture of wet-strength paper composed of cellulose fibers bonded together by a polysalt of the present invention in thermoset state.

An aqueous suspension of 50% bleached hardwood and 50% bleached softwood fibers beaten to a Canadian standard freeness of 450 ml. is diluted to a consistency of 0.6% and adjusted to pH 5.5. Nine aliquots are taken. To three of these is added the polysalt solution of Example 1 to provide the weights of polysalt shown in the table below. To three is added a solution of the anionic polymer and to three is added a solution of the cationic polymer, of which the polysalt is composed, in amounts shown in the table below. The polymer solutions are added at 1% solids; the anionic polymer is precipitated on the fibers by addition of alum. The aliquots of fiber are then processed into paper at pH 5.5. The handsheets are formed at 70 lb. basis weight (25" x 40"/500 ream) and are dried for one minute on a rotary drum drier having a drum temperature of 240° F.

The results are tabulated in Table I as follows.

TABLE I

| Run No. | Percent wet-strength agent added [1] | | | Paper wet strength (lb./in.) |
|---|---|---|---|---|
| | Polysalt | Anionic | Cationic | |
| 1 | 0.25 | | | 5.6 |
| 2 | 0.50 | | | 6.9 |
| 3 | 0.75 | | | 7.4 |
| 4 | | 0.25 | | 3.5 |
| 5 | | 0.50 | | 5.4 |
| 6 | | 0.75 | | 5.7 |
| 7 | | | 0.25 | 5.3 |
| 8 | | | 0.50 | 5.9 |
| 9 | | | 0.75 | 6.0 |

[1] Percentages are based on the dry weight of the fibers.

The results show that on an equal weight basis the polysalt is significantly more effective than either of its components.

EXAMPLE 3

To a 10%, by weight, aqueous solution containing 71 g. of polyacrylamide (M.W. 10,000) are added 36 g. (0.25 mols) of a 40% aqueous glyoxal solution, and the solution is maintained at pH 8 until its viscosity starts to increase. The pH is next adjusted to 7 and the viscosity allowed to increase to a Gardner-Holt viscosity of B–C at 30° C. The pH is then adjusted to 4.5 with hydrochloric acid and then 6.3 g. (0.06 mol) of sodium bisulfite are added. The bisulfite reacts quickly with the glyoxalated amide substituents, rendering the polymer anionic to form the first solution.

To 100 g. of the resultant first solution are added 400 g. of a 10%, by weight, solution of the thermosetting, cationic, adipic acid-diethylenetriamine-epichlorohydrin, wet-strength resin of U.S. Pat. No. 2,926,116 (commercially known as "Kymene 557"). Sufficient sulfuric acid is added to reduce the pH of the mixture to pH 3, characterized as transparent and straw-colored having a viscosity of 16 cps. at 25° C.

The mixture is employed to treat papermaking fibers as defined in Example 2 above. Similar results as set forth in Table I, supra, are noted.

EXAMPLE 4

The following illustrates the preparation of polysalts of varying mol ratios of cationic to anionic groups and anionic components of varying anionic content.

As a first element, the cationic, wet-strength resin is prepared as follows: To 206 g. (2.0 mols) of diethylenetriamine under nitrogen are added with stirring 166 g. (1.0 mol) of isophthalic acid. The mixture is then heated until water begins to distill from the mixture, usually around 180° C. The water removed is collected while the temperature is gradually raised until 36 ml. (2.0 mols) of water have been removed. The maximum temperature reached is 210° C. to 215° C. After removal of the water, the reaction mixture is cooled to about 165° C. and 146 g. (1.0 mol) of adipic acid are added. The temperature is again gradually increased and the water removed until from 32 ml. to 36 ml. of water have been removed. The maximum temperature reached is 200° C. to 210° C. After completion of the condensation, the polymer is dissolved in water.

There are next added to a solution containing 40 g. of the resultant polymer in 130 g. of water and about 8.0 g. of concentrated hydrochloric acid at 50° C., 19.9 of epichlorohydrin (1.2 mols/mol of amino groups in the condensation polymer). After the epichlorohydrin dissolves, the reaction mixture is heated at 60° C. to 65° C. until the viscosity increases to about "M" on the Gardner-Holt scale as measured at 65° C. At this point, the resin (30% solids) is cooled, diluted to 10% solids, and the pH is adjusted to 4.5 with hydrochloric acid.

As a second element, two anionic components are separately prepared in a manner similar to that of the anionic resin described in Example 1, except that the molar ratios of acrylamide:acrylic acid groups in the starting copolymers are 95:5 and 85:15, respectively, to obtain two solutions containing anionic components.

Polysalts are next prepared by mixing the above-two elements, i.e., the cationic resin with the two types of anionic resins, in the ratios shown below, and then adding sufficient sulfuric acid to adjust the pH to 3.0. Characterization of the solutions as prepared is summarized in Table II below.

TABLE II

| Polysalt | A | B | C | D |
|---|---|---|---|---|
| Mol ratio of acrylamide:acrylic acid in anionic component | 95/5 | 95/5 | 85/15 | 85/15 |
| Weight ratio of cationic component: anionic component | 2/1 | 1/1 | 2/1 | 1/1 |
| Mol ratio of anionic groups:cationic groups | 9/91 | 16/84 | 23/77 | 37/63 |

Each of the polysalts, as well as the cationic component above, is then tested as wet-strength resins in a manner similar to that detailed in Example 2, except that the pH of the pulp suspensions is adjusted to 7.

The results obtained are recorded in Table III below.

TABLE III

| Resin [1] | Percent added [2] | Wet strength [3] |
|---|---|---|
| Cationic | 0.5 | 3.9 |
| | 1.0 | 4.0 |
| Polysalt A | 0.5 | 4.8 |
| | 1.0 | 5.9 |
| Polysalt B | 0.5 | 4.1 |
| | 1.0 | 6.2 |
| Polysalt C | 0.5 | 4.0 |
| | 1.0 | 5.8 |
| Polysalt D | 0.5 | 1.5 |
| | 1.0 | 2.5 |

[1] Resin as defined in Table II, supra.
[2] Based on fiber weight.
[3] Pounds per linear inch.

An improvement in performance over the cationic resin is noted for all of the polysalts other than Polysalt D. Clearly, the latter polysalt illustrates the adverse effect of too large a mol ratio of anionic groups to cationic groups insofar as the wet-strength properties of the polysalt on fibers in papermaking are concerned.

EXAMPLE 5

The following illustrates the preparation of a polysalt wherein the cationic component is an amino-alkyl substituted polyacrylamide rendered thermosetting by epichlorohydrin residues.

The anionic component is similar to that of Example 1, differing principally in that the molar ratio of glyoxal added to amide substituents in the polymer is 1:2, respectively.

The cationic component is prepared as follows: To 100 g. of a 9.4% solution of poly-N-(2-aminoethyl)acrylamide (prepared by heating an aqueous solution of polyvinylimidazoline at 70° C. for eight hours at pH 8.5) are slowly added, with stirring, 17.6 g. of epichlorohydrin, the temperature being maintained below 25° C. The solution is then held at a temperature of 50° C. to 55° C. for eight hours, after which it is allowed to stand at room temperature for several days. The solution is then diluted to 10% solids and adjusted to pH 4. The resin sets to an insoluble and infusible film within a few minutes when heated at 100° C.

The polysalt is prepared by adding 1 part of the anionic resin solution to 4 parts of the cationic resin solution. Sufficient sulfuric acid is added to the solution to obtain a pH equal to 3.

The polysalt is next tested as a wet-strength resin as detailed in Example 2 above except that the pH of the pulp suspension is adjusted to 7. The results obtained are shown in Table IV below.

TABLE IV

| Resin: | Percent[1] | Wet strength[2] |
|---|---|---|
| Cationic alone | 0.25 | 4.7 |
|  | 0.5 | 5.3 |
| Polysalt | 0.25 | 5.5 |
|  | 0.5 | 6.6 |

[1] Based on fiber weight.
[2] Pounds per linear inch.

EXAMPLE 6

The following illustrates the preparation of a polysalt according to the present invention wherein the cationic component is a water-soluble, thermosetting, polyalkylenepolyamine resin.

The procedure of Example 1 is repeated except that the cationic resin solution is the water-soluble, thermosetting, 3,3' - iminobispropylamine - epichlorohydrin resin formed by reacting 1 mol of 3,3' - iminobispropylamine with 4 mols of epichlorohydrin.

Similar wet-strength results as shown in Example 2 are attained utilizing the polysalt hereinabove obtained.

We claim:

1. A polysalt composition consisting essentially of (a) an anionic, water-soluble polyacrylamide having a sufficient number of glyoxal-reactive amide substituents and glyoxalated amide substituents to be thermosetting, the ratio of the number of said glyoxalated amide substituents to the number of said glyoxal-reactive amide substituents being in excess of 0.06:1, and (b) a water-soluble, cationic, thermosetting, wet-strength resin for paper, said resin containing amine groups reacted with epichlorohydrin, the molar ratio of the anionic substituents in said polysalt to the cationic substituents therein being between about 1:99 and 25:75, said polysalt composition having a pH between about 0.5 and 4 when dissolved in water.

2. A polysalt according to claim 1 wherein the anionic polyacrylamide consists essentially of (a) unsubstituted acrylamide linkages, (b) glyoxalated acrylamide linkages, and (c) acrylic acid linkages, the molar ratio of the sum of linkages (a) and (b) to linkages (c) being between about 99.5:0.5 and 75:25.

3. A polysalt according to claim 1 wherein the cationic resin is an about 1:1:1 molar ratio, thermosetting, adipic acid:diethylenetriamine:epichlorohydrin, wet-strength resin.

References Cited

UNITED STATES PATENTS

| 3,556,932 | 1/1971 | Coscia | 260—72 |
| 2,926,154 | 2/1960 | Keim | 260—29.2 EP |
| 3,125,552 | 3/1964 | Loshaek | 260—836 |
| 3,556,933 | 1/1971 | Lyman | 260—72 |
| 3,709,857 | 1/1973 | Faessinger | 260—72 |
| 3,728,214 | 4/1973 | Epsy | 260—29.4 UA |
| 3,728,215 | 4/1973 | Epsy | 260—29.4 UA |
| 3,773,612 | 11/1973 | Avis | 260—29.4 R |

PAUL LIEBERMAN, Primary Examiner

U.S. Cl. X.R.

162—168; 260—29.2 EP, 29.4 R, 72